(No Model.)

W. C. CHAPMAN & W. B. MILES.
Water Filter and Cooler.

No. 235,934. Patented Dec. 28, 1880.

Witnesses:
Fred. G. Dieterich
P. C. Dietrich

Inventors:
William C. Chapman
and William B. Miles
By Parker H. Sweet Jr.,
Atty.

UNITED STATES PATENT OFFICE.

WILLIAM C. CHAPMAN AND WILLIAM B. MILES, OF TOLEDO, OHIO; SAID CHAPMAN ASSIGNOR TO HARRIET M. CHAPMAN, OF SAME PLACE.

WATER FILTER AND COOLER.

SPECIFICATION forming part of Letters Patent No. 235,934, dated December 28, 1880.

Application filed April 10, 1880. (No model.)

*To all whom it may concern:*

Be it known that we, WILLIAM C. CHAPMAN and WILLIAM B. MILES, both of Toledo, in the county of Lucas and State of Ohio, have invented certain new and useful Improvements in Water Coolers and Filters; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

Figure 1:
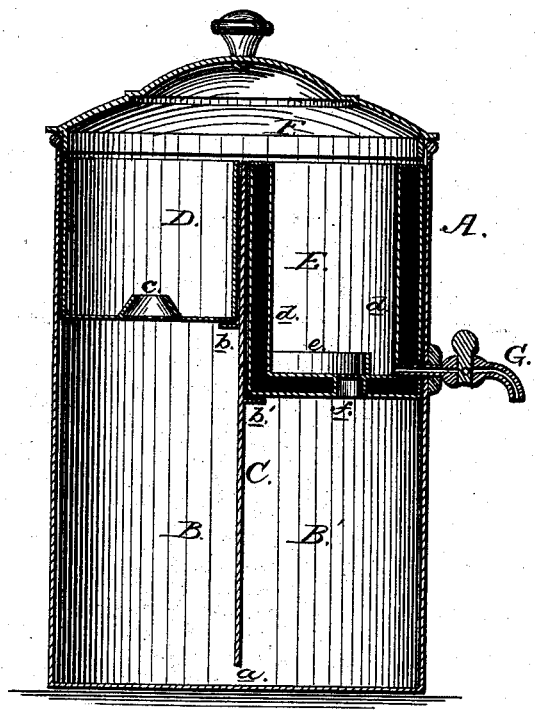
Figure 2:
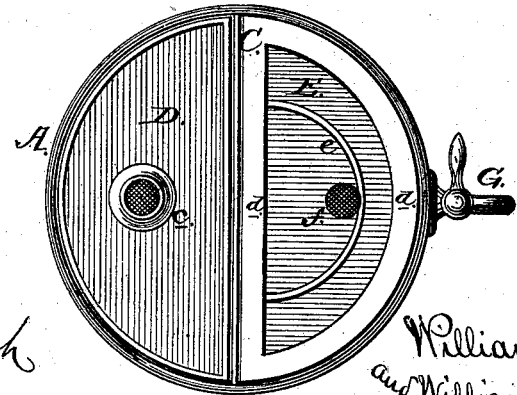

In the drawings, Figure 1 represents a longitudinal vertical section of our invention, and Fig. 2 a top-plan view thereof with the cover removed.

Similar letters of reference indicate like parts in both figures.

Our invention has for its object to provide an improved means for thoroughly filtering water, and also for cooling the same in a space not much larger than that of an ordinary water-cooler; and the invention consists of a suitable receptacle divided by a central partition into two compartments, each adapted to be filled to a certain line with suitable filtering material, and provided with a supply and distributing vessel, respectively, all as will be hereinafter more fully described, and pointed out in the claims.

Referring to the drawings, A represents the main vessel or receptacle, which is preferably of a cylindrical shape, and divided into two equal compartments, B B', by the central partition, C, which is provided with an opening, *a*, at the bottom, as fully shown in Fig. 1. At the upper part of the compartment B' is arranged a semicircular pan, D, which rests upon the flange *b* secured to the partition C, said pan being provided with a sponge-cup or raised portion, *c*, having perforations through the bottom of said pan, as shown. The upper part of the compartment B is also provided with a semicircular ice receptacle or pan, E, which is adapted to rest upon the flange *b'* secured to the partition C, said receptacle having double walls *d*, filled with charcoal or other suitable packing, and provided at the bottom with a semicircular raised flange, *e*, which incloses an opening, *f*, arranged through the bottom of said receptacle E. A lid, F, is provided to cover the entire top of the vessel, as fully shown in Fig. 1.

The general construction of our invention being as described, it will be observed that the compartments B B' are adapted to be filled with a suitable filtering material on a line with the bottoms of the semicircular pans D and E and the sponge-cup *c* in the pan D provided with a suitable sponge. The pan or vessel D is now filled with water, which, passing through the sponge-cup *c* in the bottom of the pan, gradually percolates down through the filtering material in the compartment B, and, passing through the opening *a* at the bottom of the partition C, rises up through the filtering material in the compartment B' until it enters the opening *f* in the bottom of the ice pan or vessel E, where it flows over the raised flange *e*, and, mingling with the ice contained in said vessel, is ready to be drawn off at any time by means of a suitable spigot, G, in a pure, fresh, and cool condition. The raised flange *e* is provided to catch and retain such particles of the filtering material as may accidentally pass upward through the opening *f*.

The advantages of our invention will be readily apparent, inasmuch as by means of the two filtering chambers a downward and upward filtration is secured, as also a great length of filtering-surface in a small and compact space.

Having thus described our invention, what we claim as new and useful is—

1. As a new article of manufacture, the herein-described water cooler and filter combined, consisting of the vessel A, divided into two filtering-compartments, B B', by means of the central partition, C, and provided with the supply-pan D and ice-receptacle E, substantially as and for the purpose specified.

2. In a combined water cooler and filter, the vessel A, provided with the top F, and divided into two filtering-compartments, B B', by the central partition, C, having opening *a* at the bottom thereof, in combination with the water-supply receptacle D and ice-receptacle E, substantially as and for the purpose specified.

In testimony that we claim the foregoing as our own we affix our signatures in presence of two witnesses.

WILLIAM C. CHAPMAN.
WILLIAM B. MILES.

Witnesses:
ARION E. WILSON,
ALEXANDER GLEASON.